United States Patent
Brolin

(10) Patent No.: US 8,982,699 B2
(45) Date of Patent: Mar. 17, 2015

(54) METHOD AND SYSTEM FOR PROTECTION GROUP SWITCHING

(75) Inventor: Stephen J. Brolin, Livingston, NJ (US)

(73) Assignee: Fujitsu Limited, Kawasaki-shi (JP)

( * ) Notice: Subject to any disclaimer, the term of this patent is extended or adjusted under 35 U.S.C. 154(b) by 297 days.

(21) Appl. No.: 13/076,097

(22) Filed: Mar. 30, 2011

(65) Prior Publication Data

US 2012/0250508 A1 Oct. 4, 2012

(51) Int. Cl.
| | |
|---|---|
| *H04J 1/16* | (2006.01) |
| *H04L 12/891* | (2013.01) |
| *H04L 12/815* | (2013.01) |
| *H04L 12/823* | (2013.01) |

(52) U.S. Cl.
CPC ............... *H04L 47/41* (2013.01); *H04L 47/22* (2013.01); *H04L 47/32* (2013.01); *Y02B 60/33* (2013.01)
USPC ....................................... 370/235

(58) Field of Classification Search
USPC ............ 370/223, 227–228, 230, 235
See application file for complete search history.

(56) References Cited

U.S. PATENT DOCUMENTS

| | | | | |
|---|---|---|---|---|
| 6,738,352 B1 * | 5/2004 | Yamada et al. | ............... | 370/238 |
| 7,093,027 B1 * | 8/2006 | Shabtay et al. | ............... | 709/239 |
| 7,136,350 B1 * | 11/2006 | Oren | ............... | 370/228 |
| 7,197,241 B2 * | 3/2007 | Weston-Dawkes et al. | ...... | 398/5 |
| 2006/0007854 A1 * | 1/2006 | Yu | ............... | 370/229 |
| 2006/0291378 A1 | 12/2006 | Brotherston et al. | | |
| 2007/0133398 A1 * | 6/2007 | Zhai | ............... | 370/228 |
| 2009/0073988 A1 | 3/2009 | Ghodrat et al. | | |
| 2009/0109843 A1 * | 4/2009 | Yang | ............... | 370/225 |
| 2010/0220724 A1 | 9/2010 | Rabie et al. | | |
| 2010/0306489 A1 | 12/2010 | Abts et al. | | |
| 2011/0051723 A1 | 3/2011 | Rabie et al. | | |

OTHER PUBLICATIONS

United States Office Action; U.S. Appl. No. 13/076,009; pp. 23, Aug. 16, 2013.
United States Office Action; U.S. Appl. No. 13/076,119; pp. 16, Sep. 13, 2013.
United States Final Office Action; U.S. Appl. No. 13/076,009; pp. 32, Mar. 28, 2014.
United States Final Office Action; U.S. Appl. No. 13/076,119; pp. 21, Jan. 27, 2014.

* cited by examiner

*Primary Examiner* — Hassan Kizou
*Assistant Examiner* — Ashil Farahmand
(74) *Attorney, Agent, or Firm* — Baker Botts L.L.P.

(57) ABSTRACT

According to one embodiment, a method may include receiving a plurality of flows, the plurality of flows comprising a working group of flows received via a working path and a protection group of flows received via a protection path, marking each flow in the working group with a first class marker, marking each flow in the protection group with a second class marker, determining whether each of the working group and the protection group is an active group or an inactive group, determining whether each of the plurality of flows is in the active group or in the inactive group based on whether each of the plurality of flows is marked with the first class marker or the second class marker, dropping each flow in the inactive group, and passing each flow in the active group.

13 Claims, 3 Drawing Sheets

METHOD AND SYSTEM FOR PROTECTION GROUP SWITCHING

TECHNICAL FIELD OF THE DISCLOSURE

The present disclosure relates generally to networked communications and, more particularly, to a method and system for protection group switching.

BACKGROUND

A communication network may include network elements that route packets and/or frames through the network. Some network elements may include a distributed architecture, wherein frame processing may be distributed among several subsystems of the network element (e.g., line cards, switches, and traffic managers). In some instances, a network element used in a communication network may be a multi-function Ethernet aggregation network element. A multi-function Ethernet aggregation network element may be one which supports many functions, including without limitation link aggregation, virtual LAN (VLAN) detection, and traffic management/shaping.

A multi-function Ethernet aggregation network element may include a distributed architecture including one or more plug-in units (PIUs). A PIU may comprise a modular electronic device that provides any suitable network communication functionality. For example, a PIU may include, among other things, a switch (e.g., an Ethernet switch) for switching traffic through the network element and a traffic manager for shaping and/or policing network flows.

SUMMARY

According to one embodiment, a method may include receiving a plurality of flows, the plurality of flows comprising a working group of flows received via a working path and a protection group of flows received via a protection path, marking each flow in the working group with a first class marker, marking each flow in the protection group with a second class marker, determining whether each of the working group and the protection group is an active group or an inactive group, determining whether each of the plurality of flows is in the active group or in the inactive group based on whether each of the plurality of flows is marked with the first class marker or the second class marker, dropping each flow in the inactive group, and passing each flow in the active group.

One or more other technical advantages of the disclosure may be readily apparent to one skilled in the art from the figures, descriptions, and claims included herein.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
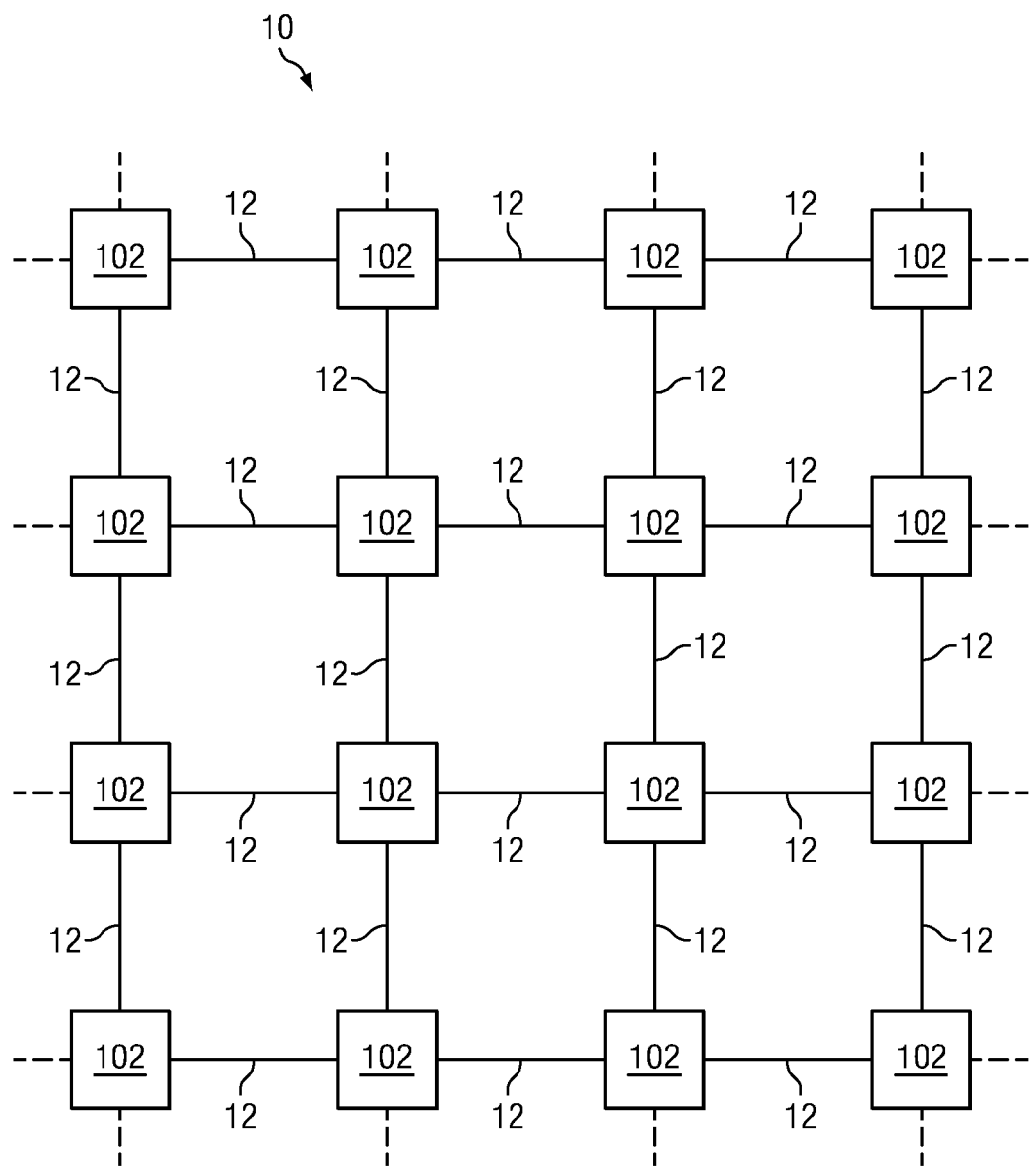
FIG. 1 illustrates a block diagram of an example communication network, in accordance with certain embodiments of the present disclosure.

FIG. 1 illustrates a block diagram of an example network 10, in accordance with certain embodiments of the present disclosure. Network 10 may include one or more transmission media 12 operable to transport one or more signals communicated by components of network 10. In certain embodiments, network 10 may carry Ethernet signals. The components of network 10, coupled together by transmission media 12, may include a plurality of network elements 102. In the illustrated network 10, each network element 102 is coupled to four other nodes. However, any suitable configuration of any suitable number of network elements 102 may create network 10. Although network 10 is shown as a mesh network, network 10 may also be configured as a ring network, a point-to-point network, or any other suitable network or combination of networks. Network 10 may be used in a short-haul metropolitan network, a long-haul inter-city network, or any other suitable network or combination of networks.

Each transmission medium 12 may include any system, device, or apparatus configured to communicatively couple network elements 102 to each other and communicate information between corresponding network elements 102. For example, a transmission medium 12 may include an optical fiber, an Ethernet cable, a T1 cable, a WiFi signal, a Bluetooth signal, or other suitable medium.

Network 10 may communicate information or "traffic" over transmission media 12. As used herein, "traffic" means information transmitted, stored, or sorted in network 10. Such traffic may comprise optical or electrical signals configured to encode audio, video, textual, and/or any other suitable data. The data may also be real-time or non-real-time. Traffic may be communicated via any suitable communications protocol, including, without limitation, the Ethernet communication protocol and the Internet Protocol (IP). Additionally, the traffic communicated in network 10 may be structured in any appropriate manner including, but not limited to, being structured in frames, packets, or an unstructured bit stream. As used herein, a "flow" may mean a sequence of packets, frames, cells, or any other segments of data communicated over a network.

Each network element 102 in network 10 may comprise any suitable system operable to transmit and receive traffic. In the illustrated embodiment, each network element 102 may be operable to transmit traffic directly to one or more other network elements 102 and receive traffic directly from the one or more other network elements 102. Network elements 102 will be discussed in more detail below with respect to FIG. 2.

Modifications, additions, or omissions may be made to network 10 without departing from the scope of the disclosure. The components and elements of network 10 described may be integrated or separated according to particular needs. Moreover, the operations of network 10 may be performed by more, fewer, or other components.

Figure 2:
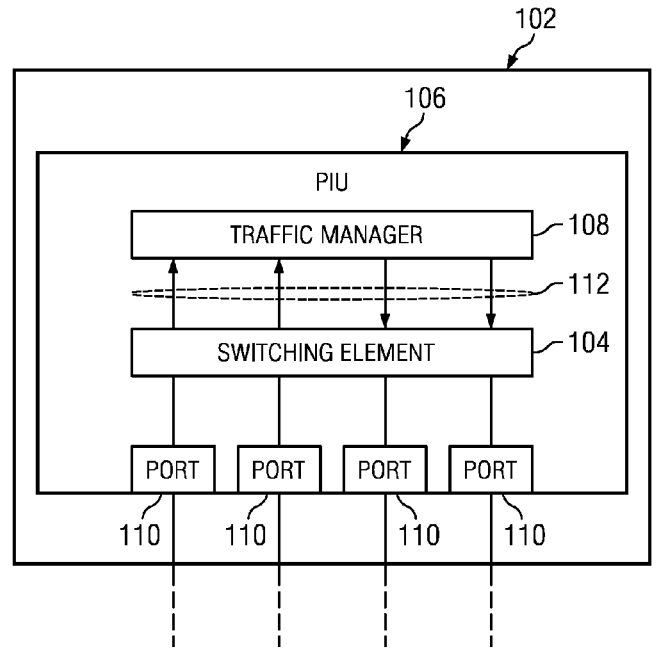
FIG. 2 illustrates a block diagram of an example network element, in accordance with certain embodiments of the present disclosure.

FIG. 2 illustrates a block diagram of certain embodiments of network element 102, in accordance with certain embodiments of the present disclosure. As discussed above, each network element 102 may be coupled to one or more other network elements 102 via one or more transmission media 12. Each network element 102 may generally be configured to receive data from and/or transmit data to one or more other network elements 102. In certain embodiments, network element 102 may comprise a switch configured to route data received by network element 102 to another device coupled to network element 102 (e.g., another network element 102 or one or more devices or clients coupled to the network element 102).

As depicted in FIG. 2, a network element 102 may include a plug-in unit (PIU) 106 with a plurality of ports 110. In some embodiments, ports 110 may be coupled to other components within network element 102. For example, an optical receiver in network element 102 may receive traffic in optical form from transmission line 12 and convert the traffic into electrical form, allowing the traffic to be communicated from the optical receiver to PIU 106 via port 110.

A PIU 106 may include any system, device, or apparatus having plug-in terminals so that some or all electrical connections of the PIU 106 can be made engaging the unit with a suitable socket of network element 102. A PIU may include any system, device, or apparatus or combination thereof to implement networking functions. As shown in FIG. 2, one example of a PIU 106 may include a switching element 104, a traffic manager 108, intra-PIU links 112, and a plurality of ports 110.

A port 110 may be communicatively coupled to a switching element 104 and may include any suitable system, apparatus, or device configured to serve as an interface between a switching element 104 and other devices within network element 102. A port 110 may be implemented using hardware, software, or any combination thereof. For example, a port 110 may comprise an Ethernet port or any other suitable port. Some of ports 110 may be interfaced to clients of a network provider (e.g., devices or networks, other than network elements 102, that are coupled to the network element 102), while other of ports 110 may be interfaced to the provider network (e.g., other network elements 102).

An intra-PIU link 112 may include any system, device, or apparatus configured to communicatively couple a switching element 104 to a traffic manager 108 and communicate information between a switching element 104 and its corresponding traffic manager 108. For example, an intra-PIU link 112 may include a metal wire, a printed wiring board path, or other suitable medium.

A traffic manager 108 may be communicatively coupled to switching element 104 on the same PIU 106 via intra-PIU links 112, and may include any suitable system, apparatus, or device configured to police and/or shape flows of traffic. Traffic shaping is the control of traffic flows in order to optimize or guarantee performance, improve latency, and/or increase usable bandwidth by delaying frames of traffic that meet certain criteria. More specifically, traffic shaping is any action on a flow of frames which manages the frames such that they conform to some predetermined constraint (e.g., a service-level agreement or traffic profile). Traffic policing is the process of monitoring network traffic for compliance with a service-level agreement and taking action to enforce such agreement. For example, in traffic policing, traffic exceeding a service-level agreement may be discarded immediately, marked as non-compliant, or left as-is, depending on an administrative policy and the characteristics of the excess traffic.

A switching element 104 may include any suitable system, apparatus, or device configured to receive ingress traffic via a port 110 and route such traffic to a particular egress port 110 based on analyzing the contents of the data (e.g., a destination address of a frame of traffic). For example, switching element 104 may comprise an Ethernet switch for switching Ethernet traffic through network element 102.

To ensure high reliability and availability in communications networks, protection switching is often used. When implemented, protection switching typically provides a primary or "working" path for a network and a redundant or "protection" path for the network. Working flows may be sent over the working path, and corresponding protection flows carrying the same information as their respective working flows may be sent over the protection path. The working flows may normally be the active flows, and the protection flows may normally be the inactive standby flows. Each path may be monitored, and if a failure is detected on the working path, the working flows on the working path may be designated as the inactive flows while the protection flows on the protection path may be designated as the active flows. An example of protection switching may be Ethernet Linear Protection Switching (ELPS) as defined by the ITU G.8031 standard.

When both a working path and a protection path are operational, a switch may at times receive both the working traffic and the protection traffic. One of the required functions associated with G.8031 protection is dropping ingress frames from the inactive flows. Because the inactive flows carry the same information as the active flows, the inactive flows must be dropped on ingress to prevent them from influencing the policing and shaping of the active flows and to prevent them from reaching the destination of the active flows. One method of dropping ingress frames from the inactive flows may be reading a unique virtual local area network (VLAN) tag of each frame, or any other suitable identifier, to identify the flow to which the frame belongs, and then discard the frame if the identified flow is designated as an inactive flow. However, where a large number of protected flows are to be managed by a network element, the total number of rules required to identify the unique flow to which each frame belongs may consume a large amount of device resources, including but not limited to device memory. Further, the number of central processing unit (CPU) clock cycles to operate on this large number of rules impacts the time to perform the protection switch. Thus, a more efficient means by which to detect and drop the inactive flows as required by the G.8031 standard is desired.

Figure 3:
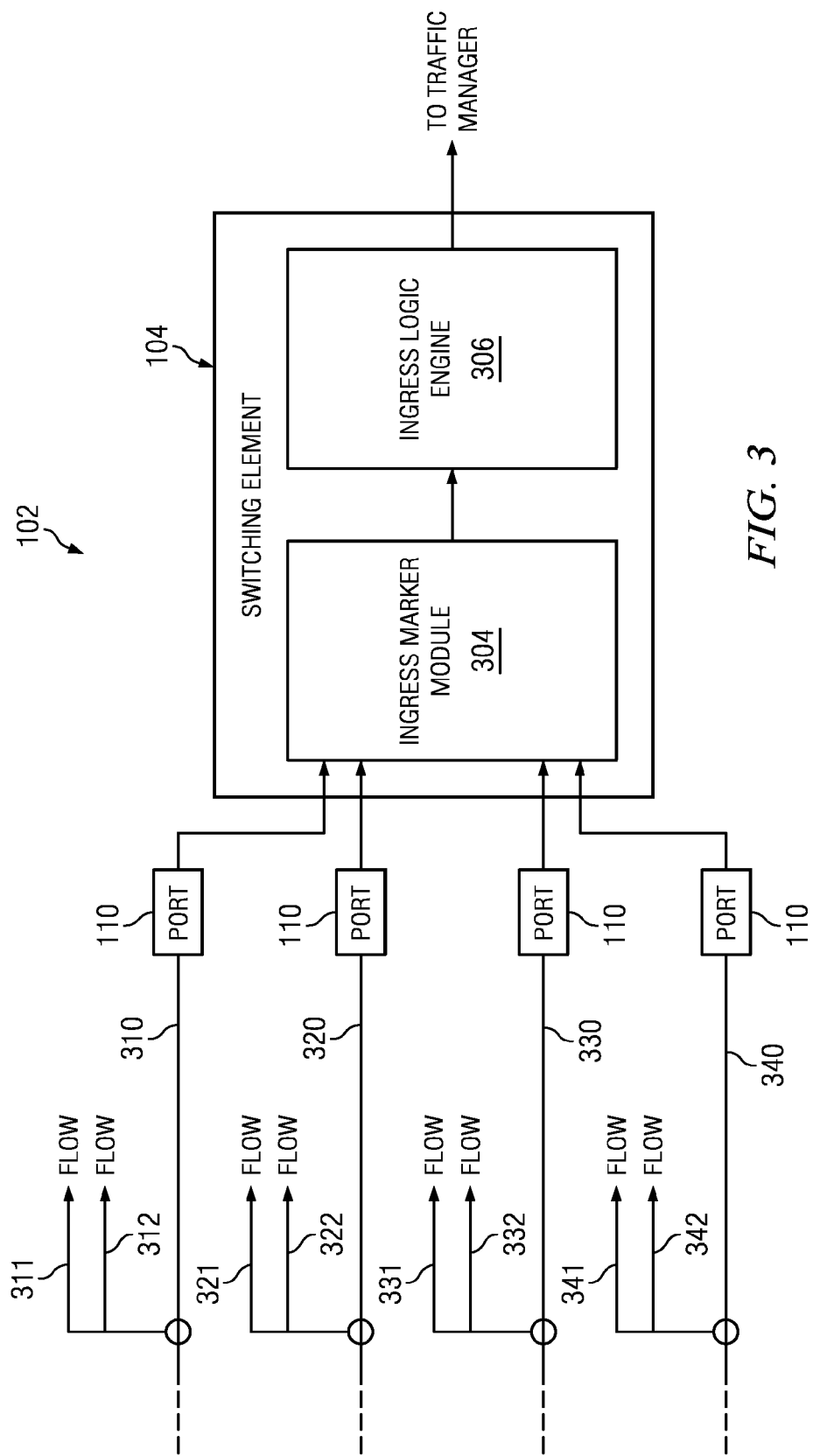
FIG. 3 illustrates a block diagram of portions of an example network element including paths into and through various components of the network element, in accordance with certain embodiments of the present disclosure.

FIG. 3 illustrates a block diagram of portions of an example network element 102 including paths into and through various components of network element 102, in accordance with certain embodiments of the present disclosure. In some embodiments, the functional blocks illustrated in FIG. 3 may be implemented partially or fully in software or firmware. Switching element 104 may include processors and/or other integrated circuits that may be configured to execute such software or firmware.

As shown in FIG. 3, paths 310, 320, 330, 340 may be coupled to a switching element 104 via a plurality of ports 110. Though FIG. 3 illustrates each path being coupled to switching element 104 via a separate port 110, in some embodiments, multiple distinct paths through network 10 may having overlapping links and thus may be ingress via one port 110 in network element 102.

Path 310 may be a working path. A first working group of flows comprising at least working flow 311 and working flow 312 may be communicated via path 310. Path 320 may be a protection path, and a first protection group of flows comprising at least protection flow 321 and protection flow 322 may be communicated via path 320. Protection flow 321 may carry the same information as the corresponding working flow 311. Similarly, protection flow 322 may carry the same information as the corresponding working flow 312. For the purposes of the present disclosure, a working flow and a protection flow, or a working group of flows and a protection group of flows, that carry the same information may be referred to as corresponding to one another.

Path 330 may be a working path. A second working group of flows comprising at least working flow 331 and working flow 332 may be communicated via path 330. Path 340 may be a protection path, and a second protection group of flows comprising at least protection flow 341 and protection flow 342 may be communicated via path 320. Protection flow 341 may carry the same information as its corresponding working flow 331. Similarly, protection flow 342 may carry the same information as its corresponding working flow 332.

Though the embodiment in FIG. 3 illustrates only two working flows for each of the first and second working groups, a working group may include all working flows that share a common path to a network element. Thus, in some embodiments, the first and second working groups of flows may include a large number of working flows (e.g., two-thousand or more) or any other suitable number. Similarly, though the embodiment in FIG. 3 illustrates only two protection flows for each of the first and second protection groups, a protection group may include all protection flows that share a common path to a network element. Thus, in some embodiments, the first and second protection groups of flows may comprise a large number of protection flows (e.g., two thousand or more) or any other suitable number. Further, in some embodiments, a switching element may receive a different number of working groups and protection groups than illustrated in FIG. 3. For example, in some embodiments, a switching element may receive more than two working groups of flows and more than two protection groups of flows. In some embodiments, a switching element may receive one working group of flows and one protection group of flows.

Upon ingress of flows into switching element 104, each flow may be marked with a class marker by an ingress marker module 304. Ingress marker module 304 may mark each working flow with a class marker that is unique to the working flow's working group. Similarly, ingress marker module 304 may mark each protection flow with a class marker that is unique to the protection flow's protection group. For example, working flows 311 and 312 may receive a first class marker identifying them as members of the first working group while protection flows 321 and 322 may receive a second class marker identifying them as members of the first protection group. Similarly, working flows 331 and 332 may receive a third class marker identifying them as members of the second working group while protection flows 341 and 342 may receive a fourth class marker identifying them as members of the second protection group.

Each flow may include a sequence of frames (e.g., Ethernet frames). For the purposes of the present disclosure, marking a flow with a class marker may mean marking each received frame in that flow with a class marker. When an Ethernet frame enters network element 102, network element 102 may attach a metatag to the Ethernet frame. The metatag may include an array of bits that may carry information about the Ethernet frame for processing at, for example, switching element 104. Though metatags may be designated for other processing functions, ingress marker module 304 may appropriate any otherwise unused set of bits in a metatag for marking Ethernet frames. One example of a metatag that may have otherwise unused bits available to be appropriated by ingress module marker 304 may include a layer three (as defined by the Open Systems Interconnection (OSI) model) communication field that is unused in network element 102 when network element 102 only utilizes the layer two functionality of a multi-function switching element 104. Ingress marker module 304 may mark an Ethernet frame by setting one or more appropriated bits in a metatag to a specific value. For example, ingress marker module 304 may write the appropriated set of bits in the respective metatags attached to the frames of working flows 311 and 312 to a first value and the appropriated set of bits in the respective metatags attached to the frames of protection flows 321 and 322 to a second value. Similarly, ingress marker module 304 may write the appropriated set of bits in the respective metatags attached to the frames of working flows 331 and 332 to a third value and the appropriated set of bits in the respective metatags attached to the frames of protection flows 341 and 342 to a fourth value. Upon marking each flow with a class marker unique to that flow's group, each flow may be communicated to ingress logic engine 306.

As illustrated in FIG. 3, after each flow receives a class marker at ingress marker module 304, each flow may be communicated to ingress logic engine 306. Ingress logic engine may receive commands or rules indicating which of a working group and a corresponding protection group is active, and which of the working group and protection group is inactive. For example, under normal operation, the first working group of flows may be designated as an active group while the corresponding first protection group of flows may be designated as an inactive group. Accordingly, under normal operation, ingress logic engine 306 may read the first class markers in working flows 311 and 312, identify those flows as members of the first working group, and communicate those flows to a traffic manager. On the other hand, under normal operation, ingress logic engine 306 may read the second class markers in protection flows 321 and 322, identify those flows as members of the first protection group, and drop those flows. As discussed above, a flow may include a sequence of frames (e.g., Ethernet frames). Thus, for the purposes of this disclosure, "dropping a flow" may mean discarding each frame in that flow received by ingress logic engine 306.

If a failure is detected on working path 310, ingress logic engine 306 may receive a command or rule indicating that the first working group of flows, communicated via failed working path 310, has been designated as an inactive group, and that the first protection group of flows, communicated via protection path 320, has been designated as an active group. Accordingly, under protection mode operation, ingress logic engine 306 may read the first class markers in working flows 311 and 312, identify those flows as members of the first working group, and drop those flows. On the other hand, under protection mode operation, ingress logic engine 306 may read the second class markers in protection flows 321 and 322, which is designated as an active group, and communicate those flows to a traffic manager.

Upon resolution of the failure on working path 310, ingress logic engine 306 may receive a command or rule indicating that the first working group of flows is again an active group and that the first protection group of flows is again an inactive group. Accordingly, ingress logic engine 306 may revert back to passing the flows in the first working group for communication to a traffic manager based on their respective first class markers, and to dropping the flows in the first protection group based on their respective second class markers.

In some embodiments with multiple working groups and protection groups, other working and protection groups may be switched back and forth between normal operation and protection mode operation depending on errors found on the respective working paths and protection paths of the other working and protection groups. For example, under normal operation, the second working group of flows may be designated as an active group while the corresponding second protection group of flows may be designated as an inactive group. Accordingly, under normal operation, ingress logic engine 306 may read the third class markers of working flows 331 and 332, identify those flows as members of the second working group, and communicate those flows to a traffic manager. On the other hand, under normal operation, ingress logic engine 306 may read the fourth class markers in protection flows 341 and 342, identify those flows as members of the second protection group, and drop those flows.

If a failure is detected on working path 330, ingress logic engine 306 may receive a command or rule indicating that the second working group of flows, communicated via failed working path 330, has been designated as an inactive group, and that the first protection group, communicated via protection path 340, has been designated as an active group. Accordingly, under protection mode operation, ingress logic engine 306 may read the third class markers in working flows 331 and 332, identify those flows as members of the second working group, and drop those flows. On the other hand, under protection mode operation, ingress logic engine 306 may read the second class markers in protection flows 341 and 342, identify those flows as members of the second protection group, which is designated as an active group, and communicate those flows to a traffic manager.

Upon resolution of the failure on working path 330, ingress logic engine 306 may receive a command or rule indicating that the second working group of flows is again an active group and that the second protection group is again an inactive group. Accordingly, ingress logic engine 306 may revert back to passing the flows in the second working group for communication to a traffic manager based on their respective third class markers and to dropping the flows in the second protection group based on their respective fourth class markers.

Though FIG. 3 shows each working group and protection group (working flows 311 and 312 in the first working group, protection flows 321 and 322 in the first protection group, working flows 331 and 332 in the second working group, and protection flows 341 and 342 in the second protection group) ingressing via separate ports 110, in some embodiments, multiple groups may ingress on the same port 110. For example, in some embodiments, a working group of flows may ingress via the same port 110 as one or more other working groups of flows. Also, in some embodiments, a working group of flows may ingress via the same port 110 as one or more protection groups of flows that do not correspond to the working group of flows. Similarly, in some embodiments, a protection group of flows may ingress via the same port 110 as one or more other protection groups of flows. Also, in some embodiments, a protection group of flows may ingress via the same port 110 as one or more working groups of flows that do not correspond to the protection group of flows.

Use of the class markers to identify groups of working flows and protection flows at ingress logic engine 306 may conserve a large amount of device resources. Switching element 104 may receive, for example, one thousand flows in a first working group, one thousand flows in a first protection group, one thousand flows in a second working group, and one thousand flows in a second protection group. Identifying each flow by a unique VLAN tag or other unique identifier at ingress logic engine 306 to determine whether the flow is part of an active group or an inactive group would require one rule per unique VLAN tag or other unique identifier for a total of four thousand rules. This large number of rules may consume a large amount of costly device resources. The large number of rules may also require a large number of rule updates during a transition from normal operation to protection mode operation for one of the sets of corresponding groups. For example, if a failure is detected on a working path, one thousand flows in a working group may transition from being active to inactive, and one thousand flows in a protection group may transition from being inactive to active. Accordingly, two thousand rules may require updating during a transition from normal operation to protection mode operation. The number of clock cycles required to perform this large number of rule updates may impact the time to perform the protection switch.

However, use of the class markers may significantly reduce the number of rules required for dropping inactive flows at ingress logic engine 306. For example, four thousand flows may be grouped into a first and second working group and a first and second protection group, each group having a unique class marker. Identifying each flow by one of four unique class markers at ingress logic engine 306 to determine whether a flow is part of an active group or an inactive group requires only one rule per unique class marker for a total of four rules. The small number of rules may conserve a significant amount of device resources, allowing the function of dropping inactive flows to be implemented at a relatively low cost. Further, transitioning a working group from active to inactive and a corresponding protection group from inactive to active may require only two rule updates. Thus, the rule updates may be performed quickly and in a manner that does not impact the time to perform a protection switch.

Figure 4:
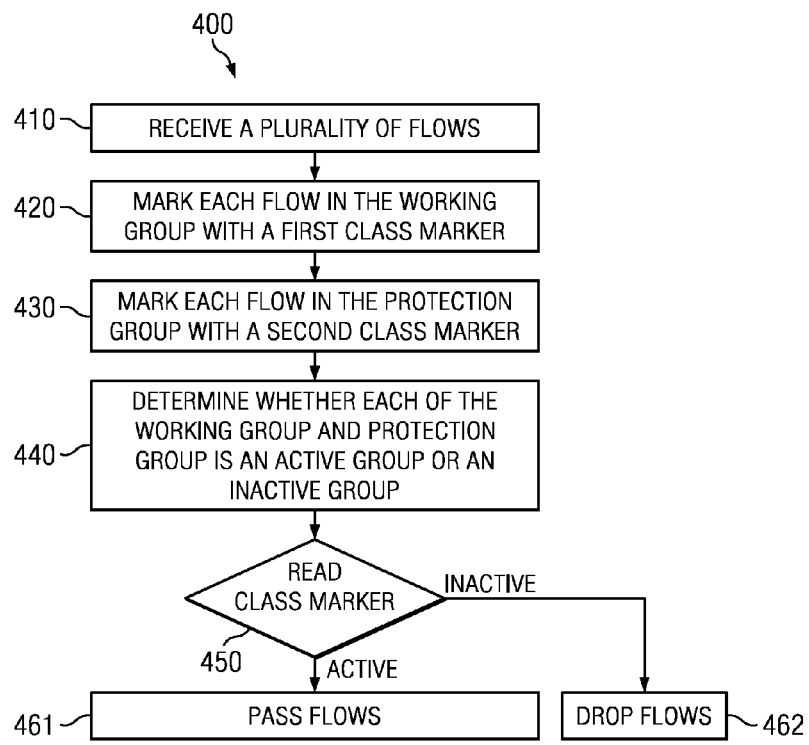
FIG. 4 illustrates a flow chart depicting an example method for dropping a group of inactive flows, in accordance with certain embodiments of the present disclosure.

FIG. 4 illustrates a flow chart depicting an example method 400 for dropping a group of inactive flows, in accordance with certain embodiments of the present disclosure.

At step 410, switching element 104 may receive a plurality of flows. The plurality of flows may comprise a working group of flows received via a working path and a protection group of flows received via a protection path.

At step 420, ingress marker module 304 may mark each flow in the working group with a first class marker. The first class marker may be unique to flows in the working group.

At step 430, ingress marker module 304 may mark each flow in the protection group with a second class marker. The second class marker may be unique to flows in the protection group.

At step 440, ingress logic engine 306 may determine whether each of the working group and the protection group is an active group or an inactive group. For example, during normal operation, the working group may be designated as the active group and the protection group may be designated as the inactive group. Alternatively, if an error is detected along the working path of the working group, then ingress logic engine 306 may receive a command or rule designating the working group as the inactive group and the protection group as the active group.

At step 450, ingress logic engine 306 may determine whether each of the plurality of flows in the active group or in the inactive group based on whether each of the plurality of flows is marked with the first class marker or the second class marker. For example, during normal operation, ingress logic engine 306 may read the first class marker on a working flow and determine that the flow is a member of the working group, which has been designated as the active group. Similarly, during normal operation, ingress logic engine 306 may read the second class marker on a protection flow and determine that the flow is a member of the protection group, which has been designated as the active group.

For flows in the active group, method 400 may proceed to step 461. At step 461, each flow in the active group may be passed for communication to a traffic manager. For example, under normal operation, flows from the working group, which has been designated as the active group, may be communicated to a traffic manager.

For flows in the inactive group, method 400 may proceed to step 462. At step 462, each flow in the inactive group may be dropped. For example, under normal operation, flows from the protection group, which has been designated as the inactive group, may be dropped. More specifically, frames from flows in the inactive protection group may be discarded as they are received by ingress logic engine 306.

Although FIG. 4 discloses a particular number of steps to be taken with respect to method 400, method 400 may be executed with greater or lesser steps than those depicted in FIG. 4. In addition, although FIG. 4 discloses a certain order of steps to be taken with respect to method 400, the steps comprising method 400 may be completed in any suitable order.

A component of network 10 may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. For example, logic may perform the functions of ingress marker module 304 and ingress logic engine 306 in switching element 104. Logic may include hardware, software, and/or other logic. Logic may be encoded in one or more tangible computer readable storage media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to network 10 without departing from the scope of the invention. The components of network 10 may be integrated or separated. Moreover, the operations of network 10 may be performed by more, fewer, or other components. Additionally, operations of network 10 may be performed using any suitable logic. As used in this document, "each" refers to each member of a set or each member of a subset of a set.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method comprising:
receiving a plurality of flows at a switching element, the plurality of flows comprising a working group of flows received via a working path and a protection group of flows received via a protection path, each of the flows including a plurality of frames, each frame including a unique identifier of an associated flow;
at the switching element, attaching a layer-three metatag to each of the plurality of frames of each flow;
at the switching element, marking each flow in the working group with a first group-identifying class marker by setting at least one bit to a first value in the layer-three metatag attached to each of the plurality of frames of each flow in the working group;
at the switching element, marking each flow in the protection group with a second group-identifying class marker by setting at least one bit to a second value in the layer-three metatag attached to each of the plurality of frames of each flow in the protection group;
determining whether each of the working group and the protection group is an active group or an inactive group;
determining whether each of the plurality of flows is in the active group or in the inactive group based on whether each of the plurality of flows is marked with the first group-identifying class marker or the second group-identifying class marker;
dropping each flow in the inactive group; and
passing each flow in the active group.

2. The method of claim 1, further comprising:
designating the protection group as the active group if a fault is detected on the working path; and
designating the working group as the active group if no fault is detected on the working path.

3. The method of claim 1, wherein dropping each flow in the inactive group comprises discarding received frames of each flow in the inactive group.

4. The method of claim 1, wherein passing each flow in the active group comprises communicating received frames of each flow in the active group to a traffic manager.

5. A switching element comprising:
an ingress marker module configured to:
receive a plurality of flows via a plurality of ports, the plurality of flows comprising a working group of flows received via a working path and a protection group of flows received via a protection path, each of the flows including a plurality of frames, each frame including a unique identifier of an associated flow;
attach a layer-three metatag to each of the plurality of frames of each flow;
mark each flow in the working group with a first group-identifying class marker by setting at least one bit to a first value in the layer-three metatag attached to each of the plurality of frames of each flow in the working group; and
mark each flow in the protection group with a second group-identifying class marker by setting at least one bit to a second value in the layer-three metatag attached to each of the plurality of frames of each flow in the protection group; and
an ingress logic engine configured to:
determine whether each of the working group and the protection group is an active group or an inactive group;
determine whether each of the plurality of flows is in the active group or in the inactive group based on whether each of the plurality of flows is marked with the first group-identifying class marker or the second group-identifying class marker;
drop each flow in the inactive group; and
pass each flow in the active group.

6. The switching element of claim 5, wherein the ingress logic engine is further configured to:
   designate the protection group as the active group if a fault is detected on the working path; and
   designate the working group as the active group if no fault is detected on the working path.

7. The switching element of claim 5, wherein the ingress logic engine is further configured to discard received frames of the each flow in the inactive group.

8. The switching element of claim 5, wherein the ingress logic engine is further configured to communicate received frames of each flow in the active group to a traffic manager.

9. A non-transitory computer readable medium embodying logic, the logic operable, when executed by a processor, to:
   receive a plurality of flows, the plurality of flows comprising a working group of flows received via a working path and a protection group of flows received via a protection path, each of the flows including a plurality of frames, each frame including a unique identifier of an associated flow;
   attach a layer-three metatag to each of the plurality of frames of each flow;
   mark each flow in the working group with a first group-identifying class marker by setting at least one bit to a first value in the layer-three metatag attached to each of the plurality of frames of each flow in the working group;
   mark each flow in the protection group with a second group-identifying class marker by setting at least one bit to a second value in the layer-three metatag attached to each of the plurality of frames of each flow in the protection group;
   determine whether each of the working group and the protection group is an active group or an inactive group;
   determine whether each of the plurality of flows is in the active group or in the inactive group based on whether each of the plurality of flows is marked with the first group-identifying class marker or the second group-identifying class marker;
   drop each flow in the inactive group; and
   pass each flow in the active group.

10. The non-transitory computer readable medium of claim 9, wherein the logic is further operable, when executed, to:
    designate the protection group as the active group if a fault is detected on the working path; and
    designate the working group as the active group if no fault is detected on the working path.

11. The non-transitory computer readable medium of claim 9, wherein the logic is further operable, when executed, to discard received frames of the each flow in the inactive group.

12. The non-transitory computer readable medium of claim 9, wherein the logic is further operable, when executed, communicate received frames of each flow in the active group to a traffic manager.

13. A method comprising:
    at a switching element, receiving a plurality of flows grouped into a plurality of working groups and a plurality of corresponding protection groups, each of the flows including a plurality of frames, each frame including a unique identifier of an associated flow;
    at the switching element, attaching a layer-three metatag to each of the plurality of frames of each flow;
    at the switching element, marking each flow with a group-identifying class marker by setting at least one bit in the layer-three metatag attached to each of the plurality of frames of each flow;
    assigning an active or inactive status to each group, wherein each protection group has an opposite status as compared to its corresponding working group;
    identifying each flow as active or inactive based on the group-identifying class marker of each flow and the active or inactive status of each group;
    dropping each inactive flow; and
    passing each active flow.

* * * * *